(12) United States Patent
Finley

(10) Patent No.: US 10,185,940 B2
(45) Date of Patent: Jan. 22, 2019

(54) IMAGE CAPTURE TRANSACTION PAYMENT

(71) Applicant: NCR Corporation, Duluth, GA (US)

(72) Inventor: Michael C. Finley, Roswell, GA (US)

(73) Assignee: NCR Corporation, Atlanta, GA (US)

( * ) Notice: Subject to any disclaimer, the term of this patent is extended or adjusted under 35 U.S.C. 154(b) by 57 days.

(21) Appl. No.: 14/132,985

(22) Filed: Dec. 18, 2013

(65) Prior Publication Data
US 2015/0170118 A1    Jun. 18, 2015

(51) Int. Cl.
*G06Q 20/10* (2012.01)
*G06Q 20/20* (2012.01)
*G06Q 20/32* (2012.01)
*G06Q 30/06* (2012.01)

(52) U.S. Cl.
CPC ......... *G06Q 20/102* (2013.01); *G06Q 20/204* (2013.01); *G06Q 20/32* (2013.01); *G06Q 30/06* (2013.01)

(58) Field of Classification Search
CPC .... G06Q 20/102; G06Q 20/204; G06Q 20/32; G06Q 30/06
USPC ......................................................... 705/17
See application file for complete search history.

(56) References Cited

U.S. PATENT DOCUMENTS

| | | | |
|---|---|---|---|
| 6,726,094 B1 | 4/2004 | Rantze et al. | |
| 8,218,873 B2 | 7/2012 | Boncyk et al. | |
| 8,380,177 B2 | 2/2013 | Laracey | |
| 9,305,295 B2 | 4/2016 | Laracey | |
| 2012/0054046 A1* | 3/2012 | Albisu | G06Q 20/20 705/16 |
| 2012/0101941 A1* | 4/2012 | Kang | G06Q 20/102 705/40 |
| 2012/0136780 A1* | 5/2012 | El-Awady | G06Q 20/102 705/40 |
| 2012/0209749 A1* | 8/2012 | Hammad | G06Q 30/06 705/27.1 |
| 2013/0021872 A1 | 1/2013 | Husom | |
| 2013/0022231 A1* | 1/2013 | Nepomniachtchi | G06Q 20/042 382/102 |
| 2013/0159081 A1* | 6/2013 | Shastry | G06Q 30/0274 705/14.23 |
| 2013/0218721 A1* | 8/2013 | Borhan | G06Q 20/322 705/26.41 |
| 2013/0297414 A1 | 11/2013 | Goldfarb et al. | |
| 2014/0236820 A1* | 8/2014 | Carlton | G06Q 20/108 705/42 |
| 2014/0297441 A1* | 10/2014 | Thams | G06K 19/06028 705/23 |

(Continued)

FOREIGN PATENT DOCUMENTS

WO    WO/2007/021996    2/2007

*Primary Examiner* — Vanel Frenel
(74) *Attorney, Agent, or Firm* — Schwegman, Lundberg & Woessner

(57) ABSTRACT

Various systems, methods, and apparatuses are described for facilitating payment for a transaction. One example method may comprise capturing an image comprising a transaction bill and a form of payment for providing payment for the transaction. The example method may further comprise posting payment for the transaction to a point-of-sale terminal based at least in part on the captured image. Similar and related methods, apparatuses, systems, and computer program products are also provided.

19 Claims, 7 Drawing Sheets

(56) References Cited

U.S. PATENT DOCUMENTS

2015/0012426 A1* 1/2015 Purves ............... G06Q 30/0623
  705/41
2016/0217441 A1 7/2016 Ito

* cited by examiner

IMAGE CAPTURE TRANSACTION PAYMENT

BACKGROUND OF THE INVENTION

The advancement of technology has broadened the capabilities of devices, creating opportunities for new and advanced solutions to common problems. Establishments, such as retailers and food service providers, want to provide fast, reliable service to their customers using the latest technologies while keeping costs down. Similarly, customers want to use the latest technology to simplify their transactions at these establishments while maintaining privacy and security.

Payment for customer transactions at retail and restaurant establishments typically requires many time-consuming steps. These payment interactions also usually require the customer to surrender a payment card to an employee or sales associate of the establishment, thereby creating opportunities for identity theft. Additionally, payment transactions using cards, such as credit and debit cards, are becoming increasingly more frequent in comparison to cash transactions. These card transactions come at a price to merchants, however, as various fees may be applied to each card transaction.

Accordingly, it may be desirable to provide a method for facilitating payment for a transaction that is less costly to merchants and simpler and more secure for the customer thereby avoiding the above, and other, drawbacks associated with the current art.

BRIEF SUMMARY OF THE INVENTION

Various embodiments of the present invention provide systems, methods, apparatuses, and computer program products for facilitating payment for a transaction.

An example method for providing payment for a transaction may comprise capturing an image comprising a transaction bill and a form of payment for providing payment for the transaction; and posting payment for the transaction to a point-of-sale terminal based at least in part on the captured image.

An example method for facilitating payment for a transaction may comprise obtaining a captured image comprising an indication of a bill for a transaction and a payment card for paying the bill, the indication of the bill comprising a transaction identifier; determining the transaction identifier from the captured image; determining payment information from the captured image; and effecting payment of the transaction identified by the transaction identifier using the payment information.

An example system may comprise a device configured to capture an image of a transaction bill and a form of payment for paying the transaction bill; a point-of-sale terminal configured to apply payment to the transaction bill based at least in part on the form of payment in the captured image.

BRIEF DESCRIPTION OF THE DRAWINGS

Figure 1:
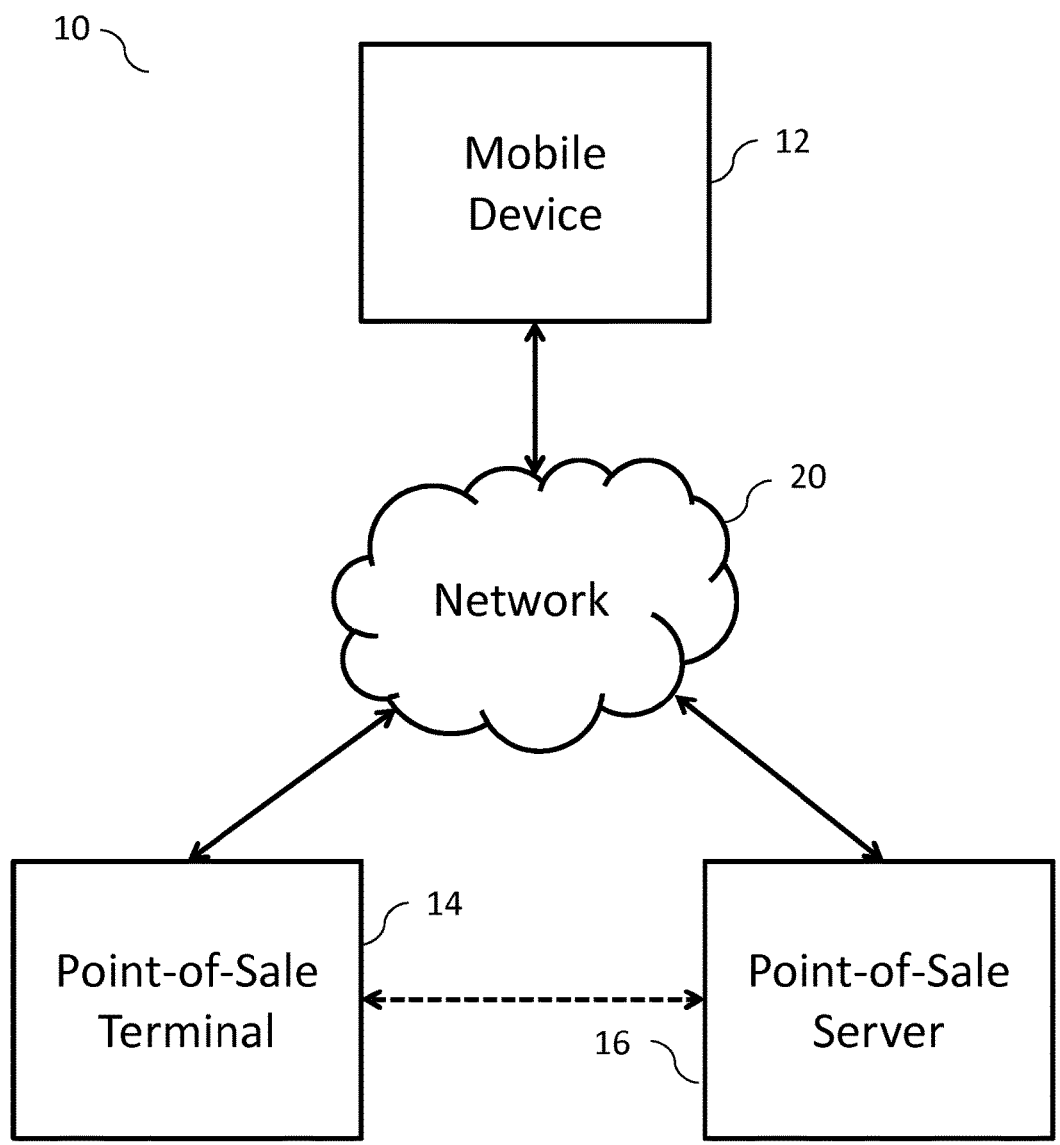

Having thus described the invention in general terms, reference will now be made to the accompanying drawings, which are not necessarily drawn to scale, and wherein:

FIG. 1 provides an illustration of one embodiment of an architecture that can be used to practice various aspects of the present invention.

Figure 2:

FIG. 2 provides an example of a bill for a transaction according to an example embodiment of the present invention.

Figure 3A:

FIG. 3A provides an example of a bill for a transaction and a form of payment according to an example embodiment of the present invention.

Figure 3B:

FIG. 3B provides an example of a bill for a transaction and a form of payment according to an example embodiment of the present invention.

Figure 4A:
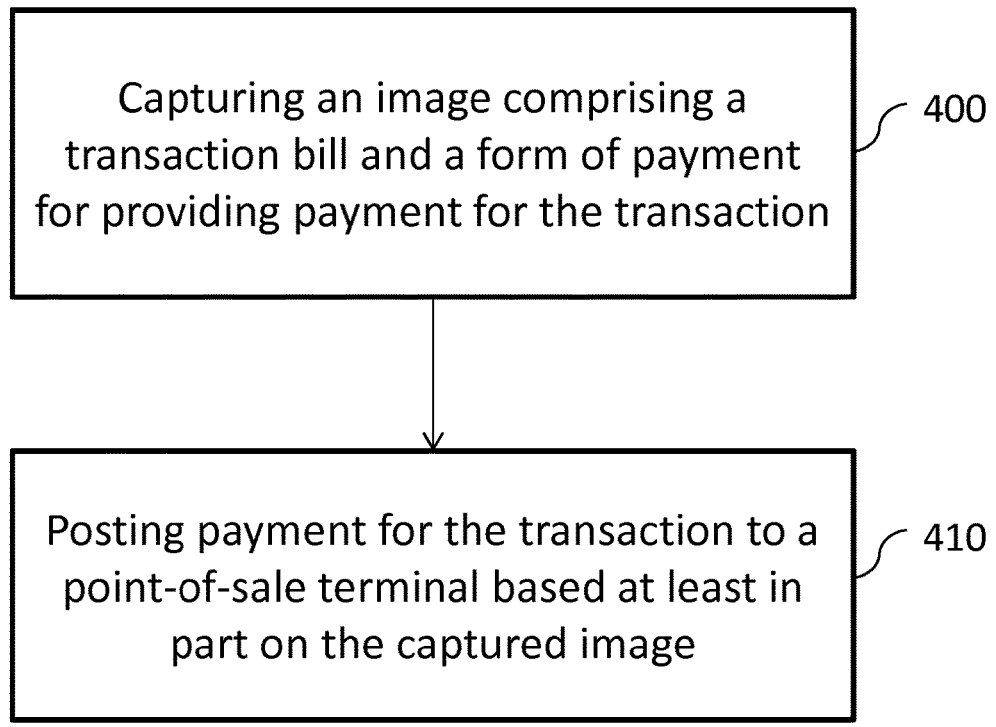

FIG. 4A provides a flowchart for facilitating payment for a transaction according to an embodiment of the present invention.

Figure 4B:
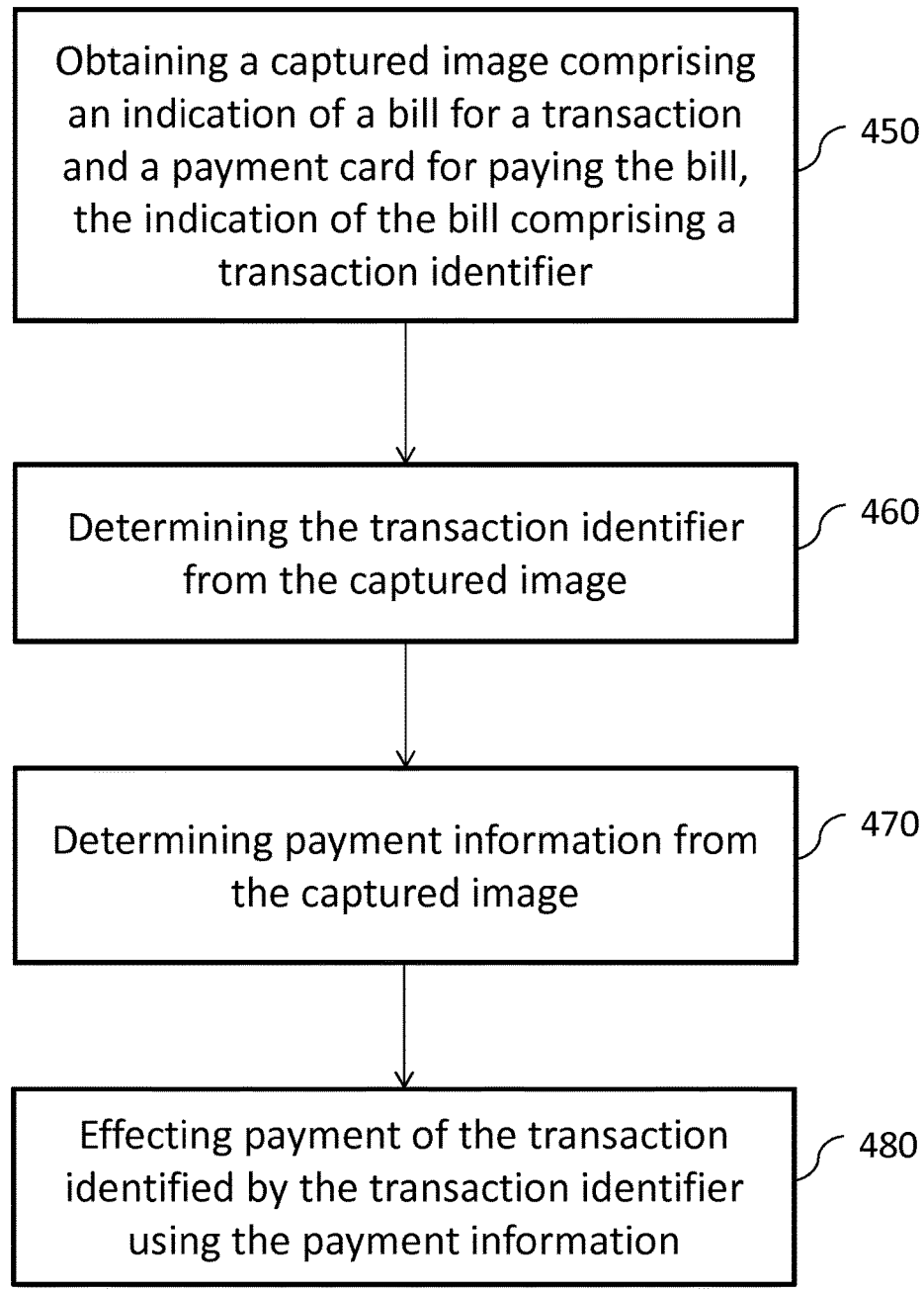

FIG. 4B provides a flowchart for facilitating payment for a transaction according to an embodiment of the present invention.

Figure 5:
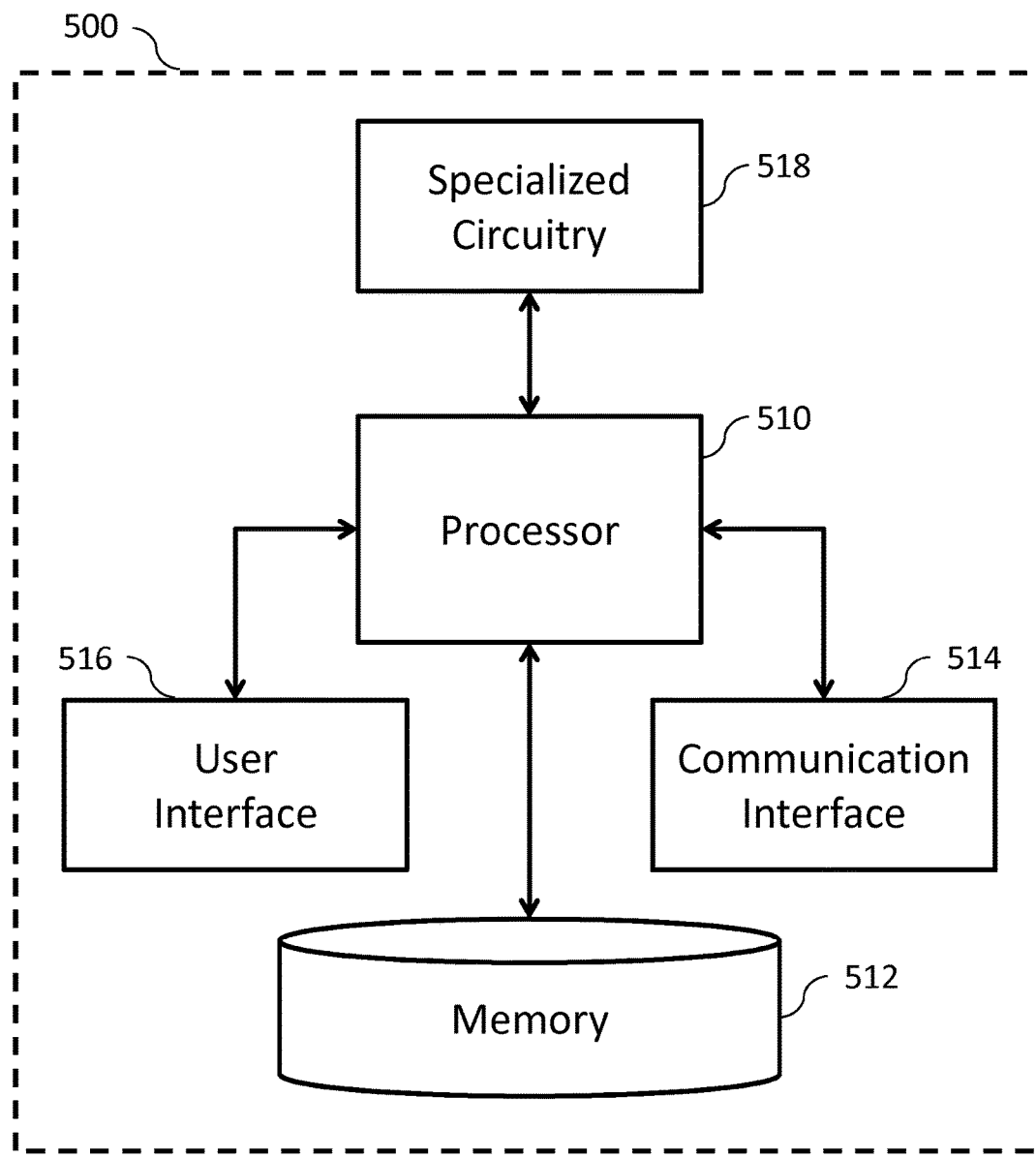

FIG. 5 provides a schematic diagram of a generic apparatus according to an embodiment of the present invention.

DETAILED DESCRIPTION OF THE INVENTION

Various embodiments of the present invention provide a way to pay for a transaction that is both convenient to customers and cost-reducing for merchants. For example, a customer may capture an image of a receipt or bill together with the customer's payment card (e.g., debit or credit card) thus allowing a customer to pay for the associated transaction in one step while reducing the payment card fees paid by the merchant due to the proof of presence of the payment card.

FIG. 1 provides an illustration of a system 10 according to various embodiments of the present invention. An example system 10 may comprise a mobile device 12, point-of-sale terminal 14, and/or a point-of-sale server 16. Certain embodiments may lack one or more of the described entities of the system 10 and/or may have more than one of a particular entity.

The various entities of the system 10 may be in communication with one another, for example via network 20. Network 20 may comprise wired and/or wireless connections.

In various embodiments, the system 10 may be implemented at an establishment where a commercial transaction takes place, such as a retail or restaurant environment. The establishment may operate a point-of-sale server 16 and one or more point-of-sale terminals 14. In some instances, the point-of-sale server 16 may be at a location separate from the establishment, such as a central office, or separate from the point-of-sale terminals 14, such as a back office. The establishment may have one or more customers. Some of the customers of the establishment may possess a mobile device 12. The mobile devices 12 of the customers may interact with the point-of-sale terminals 14 and/or point-of-sale servers 16 to provide payment for a customer transaction at the establishment.

It should be noted that other system architectures are contemplated that may be used to practice various aspects of the invention. Thus, the system 10 provided in FIG. 1 is for illustrative purposes only and should not be construed to limit the scope of the invention. Further, while FIG. 1 illustrates certain system entities as separate, standalone entities, the various embodiments are not limited to this particular architecture.

Turning to the operation of the system 10, in various embodiments, a customer or patron of the establishment may take part in a transaction. For example, the customer may participate in a transaction to purchase one or more retail or food items from the establishment. The customer may participate in the transaction at the establishment, remotely, or via some combination of the two.

After a customer has selected items for purchase in the transaction, the customer may identify those items to an employee (e.g., sales associate or waiter) of the establishment to begin the payment process. The employee may enter the selected items into a point-of-sale terminal 14 via any number of known methods.

In example embodiments, the point-of-sale terminal 14 may generate a bill or check for a transaction, such as the example bill depicted in FIG. 2. The bill may comprise transaction information. In example embodiments, the transaction information may comprise general information about the transaction (e.g., establishment name and/or address, date, time, employee), information about the items being purchased in the transaction (e.g., name, price, quantity, discounts), and/or summary information about the transaction (e.g., subtotal, tax, discounts, reward information, gratuity, total price). The bill information may permit a customer to review the details of the transaction prior to providing payment for the transaction.

According to various embodiments, the bill may comprise an identifier associated with the transaction.

In example embodiments, the transaction identifier may comprise an alphanumeric string or code that may be printed on and read from the bill. In other embodiments, the transaction identifier may be displayed on a screen, such as the screen of a point-of sale terminal, for example in a quick service environment.

In some embodiments, the transaction identifier may be in encoded form on the bill. For example, the transaction identifier may be in the form of a bar code, such as a matrix bar code, one-dimensional bar code, two-dimensional bar code (e.g., a Quick Response (QR) code), and/or the like. In some instances, the transaction identifier may comprise an indication of some or all of the transaction information.

In other embodiments, both a human-readable and a machine-readable version of the transaction identifier may be included on the bill.

After receiving the bill from an employee of the establishment, the customer may use the bill to assist with payment. In particular, the customer may use a mobile device 12, such as his or her own smartphone, to capture an image of the bill along with a form of payment for the transaction. The mobile device 12 may capture the image such that the transaction identifier on the bill is visible as well as the necessary details of the form of payment. In embodiments where the bill and/or transaction identifier is displayed on a screen, the customer may use a mobile device 12 to capture an image of the screen displaying the bill and/or transaction identifier along with a form of payment for the transaction.

The customer's form of payment may be a credit card, debit card, and/or the like. In other embodiments, the form of payment may be a gift card, a loyalty card, and/or the like. In yet other embodiments, the form of payment may be a membership card, government identification card, student identification card, and/or the like. In some instances, the customer may present both a credit/debit card and a loyalty card to be captured in the image together with the bill. In this regard, the customer may be able to pay for the transaction based on the credit/debit card and to receive loyalty points or awards based on the loyalty card. In some embodiments, the customer may present more than one payment card. For example, the customer may present both a payment card and a loyalty card. In another example, the transaction may be associated with multiple customers, and each customer may present their own payment card such that payment is distributed among the cards presented.

In example embodiments, the bill may comprise an area where the customer's form(s) of payment may be placed while the mobile device 12 captures the image. For example, as shown for example in FIG. 2, there may be a designated area (e.g., a blank area or outlined area) on the bill in the shape of a credit/debit card, or sufficiently large to fit a credit/debit card, where the customer may place his or her credit/debit card atop the bill while the mobile device 12 captures the image.

In various embodiments, the customer may place the form of payment anywhere on the bill. In this regard, the customer may place the bill on a surface and place the payment card atop the bill, as shown for example in FIG. 3A. In other embodiments, the form of payment may be placed partially atop the bill or proximate the bill (e.g., above, below, beside), as shown for example in FIG. 3B, such that both the transaction identifier of the bill and the necessary details of the payment card (e.g., name, card number, expiration date, bank, card provider, payment network) may be captured together in the image.

The mobile device 12 may, in some instances, capture an image of the front of the payment card and an image of the back of the payment card. In these instances, each of the multiple images may include the transaction identifier of the bill, or only one of the images may include the transaction identifier of the bill.

Prior to the mobile device 12 capturing the image, the customer may write additional information on the bill. For example, the customer may write a gratuity amount to be added to the transaction, additional information associated with the form of payment (e.g., personal identification number (PIN), address, security code), and/or the like. In some instances, the customer may sign the bill before the mobile device 12 captures the image. In other instances, the customer may sign directly on a touch screen of the mobile device 12, which may increase the security of the card processing.

The mobile device 12 may capture the image or images via a camera associated with the mobile device 12, such as an integrated or external camera.

According to various embodiments, the mobile device 12, in example embodiments, may be configured to execute an application (e.g., a mobile app) for assisting the customer with the transaction. The application may permit the customer to capture an image of the bill and payment card, for example via a camera of the mobile device 12. In some embodiments, the application may store the captured image in memory of the mobile device 12.

The application may facilitate the customer taking additional actions subsequent to capturing the image, such as via an interface of the application. For example, the application may permit the customer to add an amount of gratuity to the payment total after capturing the image. In another example, the application may permit the customer to enter supplementary or confirmatory information associated with the transaction, such as adding a security code or PIN not visible in the image or confirming one or more digits of the card number.

In example embodiments, the mobile device 12 (e.g., via the application) may extract information from the captured image. For example, the mobile device 12 may determine or extract the transaction identifier from the image, and in some instances the mobile device 12 may further decode an encoded version of the transaction identifier. The mobile device 12 may determine or extract payment information details associated with the payment card from the image. The determination of the payment information may be based on character recognition, such as optical character recognition (OCR). In some instances, the mobile device 12 may store the extracted information together with the captured image or in place of the captured image. In other embodiments, the steps above may be performed by a point-of-sale terminal 14 and/or point-of-sale server 16 rather than the mobile device 12.

According to some embodiments, the mobile device 12 may post payment for the transaction using the captured image. In some instances, the mobile device 12 may send captured information to a point-of-sale terminal 14 and/or point-of-sale server 16 to effect payment for the transaction. For example, the mobile device 12 may transmit the captured image and/or the extracted information to the point-of-sale terminal 14 and/or point-of-sale server 16. The point-of-sale terminal 14 and/or point-of-sale server 16 may store a copy of the information received from the mobile device 12.

The point-of-sale terminal 14 and/or point-of-sale server 16 may be configured to use the information received from the mobile device 12 to complete payment for the customer transaction. In this regard, the point-of-sale terminal 14 and/or point-of-sale server 16 may determine or extract information from the captured image or use the information previously determined or extracted from the captured image by the mobile device 12.

In example embodiments, the point-of-sale terminal 14 and/or point-of-sale server 16 may use the transaction identifier obtained from the information received from the mobile device 12 to identify the transaction. The point-of-sale terminal 14 and/or point-of-sale server 16 may apply the payment information received from the mobile device 12 to complete pay for the identified transaction. In some instances, the point-of-sale terminal 14 and/or point-of-sale server 16 may generate a receipt confirming the payment and transaction details. The point-of-sale terminal 14 and/or point-of-sale server 16 may transmit the receipt to the mobile device 12 to be stored, displayed to the customer, or printed by the mobile device 12. In other instances, the point-of-sale terminal 14 and/or point-of-sale server 16 may transmit a confirmation to the mobile device 12 confirming the payment was processed and providing the transaction details.

In other embodiments, the mobile device 12 may post payment for the transaction without further interaction with the point-of-sale terminal 14 and/or point-of-sale server 16. In this regard, the mobile device 12 may complete the payment transaction without sending any information to the point-of-sale terminal 14 or point-of-sale server 16. In this regard, the mobile device 12 may keep the captured and/or extracted information confidential from the point-of-sale terminal 14 and point-of-sale server 16. The mobile device 12 may use a mobile payment service (e.g., mobile wallet) to pay for the identified transaction using the captured payment information.

According to example embodiments, the mobile device 12 may store a copy of the captured image or the portion of the captured image depicting the payment card information. In these embodiments, the stored payment information may be used for payment for future transactions. The stored copy may be stored securely and/or in encrypted form.

Various modifications may be made to the above described embodiments within the scope of the invention. For example, in some embodiments, the customer's payment card may be replaced with a personal check, such as a paper check. In this way, the paper check may be used to pay for the transaction in the way the payment card is used described above.

In other embodiments, additional information may be captured along with the payment and transaction information. For example, the bill may further comprise a survey or questionnaire, for which the responses provided by the customer may also be captured along with payment and transaction details.

FIG. 4A provides a flowchart according to an example method for facilitating payment for a transaction. The operations performed by a method, apparatus, and computer program product of this example embodiment are illustrated from the perspective of an apparatus 500 embodied as a mobile device 12. The apparatus 500 embodied by the mobile device 12 may comprise means, such as the specialization circuitry 518, the processor 510, or the like. In this example embodiment, the various operations may be performed by the specialized circuitry 518 embodied as transaction payment circuitry. At operation 400, the example method may comprise capturing an image comprising a transaction bill and a form of payment for providing payment for the transaction. The example method may further comprise posting payment for the transaction to a point-of-sale terminal based at least in part on the captured image at operation 410.

FIG. 4B provides a flowchart according to an example method for facilitating payment for a transaction. The operations performed by a method, apparatus, and computer program product of this example embodiment are illustrated from the perspective of an apparatus 500 embodied as a point-of-sale terminal 14 or a point-of-sale server 16. The apparatus 500 embodied by the point-of-sale terminal 14 or point-of-sale server 16 may comprise means, such as the specialization circuitry 518, the processor 510, or the like. In this example embodiment, the various operations may be performed by the specialized circuitry 518 embodied as transaction payment circuitry. At operation 450, the example method may comprise obtaining a captured image comprising an indication of a bill for a transaction and a payment card for paying the bill, the indication of the bill comprising a transaction identifier. The example method may further comprise determining the transaction identifier from the captured image at operation 460. At operation 470, the example method may further comprise determining payment information from the captured image. The example method may further comprise effecting payment of the transaction identified by the transaction identifier using the payment information at operation 480.

Various embodiments provide numerous benefits and advantages to both customers and merchants.

Some advantageous embodiments facilitate a customer reducing the steps necessary for to pay for a transaction. A customer may receive a bill or check for a transaction, place a payment card on the bill, and capture an image of the bill and payment card together, which may be sent to a point-of-sale terminal to complete payment. In this regard, a customer does not need to provide a payment card to an employee of the establishment (e.g., a waiter) to pay the bill, wait for the employee to take the card to a point-of-sale terminal to complete payment, and return with a second receipt for the customer to sign.

In various advantageous embodiments, a customer may not be required to provide a payment card having confidential information to an employee (e.g., waiter or sales associate) of the establishment. In this regard, the customer may capture an image of the payment card and bill using his or her own mobile device and transmit the payment information directly to a point-of-sale terminal or server without exposing his or her payment card details to the employee. Such embodiments reduce the risk of identity theft.

In other advantageous embodiments, storing the captured image of the bill together with the payment card may permit the customer to verify the transaction, for example by providing evidence to assist with chargeback dispute resolution.

In yet other advantageous embodiments, capturing an image of the payment card with the bill allows the merchant to process the payment at a lower interchange rate. That is, the captured image of the card may permit a merchant to receive the card present interchange rate for the transaction.

In some advantageous embodiments, the presence of the customer's signature in the captured image may permit the merchant to benefit from better processing rates.

In other advantageous embodiments, the ability to capture an image of the payment card may permit a merchant to avoid the costs associated with purchasing and operating a card reader device to read the payment card.

In yet other advantageous embodiments, the ability to capture an image of the signed bill may permit a merchant to avoid the costs associated with purchasing and operating a signature capture device to capture the customer's signature.

In some advantageous embodiments, the ability to capture an image of the payment card permits a customer to reuse the captured image for payment of future transactions.

In various advantageous embodiments, a customer located remotely from the merchant's establishment may use the same process to pay for a transaction. For example, a customer may purchase items online or over the phone, print a bill or check, and capture an image of the payment card with the bill. In this regard, the merchant may be able to receive reduced transaction or processing fees and interchange rates even when the customer is not in store. The customer may be able to use a mobile application rather than a web site to provide the payment details, which may be more secure.

In other advantageous embodiments, the processes above may be used by delivery drivers to take payment upon delivery of food, products, or services.

The operations of the methods described herein may be carried out in any suitable order, or simultaneously where appropriate. The methods described herein may be performed by software in machine readable form on a tangible storage medium or as a propagating signal.

In various embodiments, a mobile device 12, point-of-sale terminal 14, and/or point-of-sale server 16 may be embodied as or otherwise include an apparatus 500 as generically represented by the block diagram of FIG. 5. In the example embodiment, the apparatus 500 may comprise various means for performing the various functions herein described. These means may comprise one or more of a processor 510, memory 512, communication interface 514, user interface 516, or specialized circuitry 518. The various means may be in communication with one another, such as via a bus.

The means of the apparatus 500 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 512) that is executable by a suitably configured processing device (e.g., the processor 510), or some combination thereof. In some example embodiments, the processor 510, memory 512, communication interface 514, user interface 516, and/or specialized circuitry 518 may be embodied as a chip or chip set.

The processor 510 may, for example, be embodied as various means including circuitry, one or more microprocessors with accompanying digital signal processor(s), one or more processor(s) without an accompanying digital signal processor, one or more coprocessors, one or more multi-core processors, one or more controllers, one or more computers, various other processing elements including integrated circuits such as, for example, an ASIC (application specific integrated circuit) or FPGA (field programmable gate array), one or more other hardware processors, or some combination thereof. Although illustrated in FIG. 5 as a single processor, in some embodiments the processor 510 may comprise a plurality of processors. The plurality of processors may be in operative communication with each other and may be collectively configured to perform one or more functionalities of the apparatus 500 as described herein. The plurality of processors may be embodied on a single device or distributed across a plurality of devices collectively configured to function as the apparatus 500.

In some example embodiments, the processor 510 may be configured to execute instructions stored in the memory 512 or memory otherwise accessible to the processor 510. These instructions, when executed by the processor 510, may cause the apparatus 500 to perform one or more of the functionalities of the apparatus 500 as described herein. Further, the processor 510 may comprise functionality to operate one or more software programs, which may be stored in memory. For example, the processor 510 may be capable of operating a connectivity program, such as a web browser. The connectivity program may allow the apparatus 500 to transmit and receive web content, such as location-based content, according to a protocol, such as Wireless Application Protocol (WAP), hypertext transfer protocol (HTTP), and/or the like. The apparatus 500 may be capable of using protocol(s), such as Transmission Control Protocol/Internet Protocol (TCP/IP), to transmit and receive web content across the internet or other networks.

The memory 512 may comprise, for example, volatile memory, non-volatile memory, or some combination thereof. In this regard, the memory 512 may comprise one or more tangible and/or non-transitory computer-readable storage media that may include volatile and/or non-volatile memory. Although illustrated in FIG. 5 as a single memory, the memory 512 may comprise a plurality of memories. The plurality of memories may be embodied on a single device or may be distributed across a plurality of devices collectively configured to function as the apparatus 500. In various example embodiments, the memory 512 may comprise a magnetic storage device (e.g., hard disk), dynamic and/or static random access memory (RAM), read only memory (ROM), cache memory, flash memory, optical disc, subscriber identity module (SIM), removable user identity module (R-UIM), circuitry configured to store information, or some combination thereof. The memory 512 may be configured to store information, data, applications (e.g., software programs), instructions, and/or the like, in some instances for execution by the processor 510, for enabling the apparatus 500 to carry out various functions in accordance with various example embodiments.

The communication interface 514 may be embodied as any device or means embodied in circuitry, hardware, a computer program product comprising computer readable program instructions stored on a computer readable medium (for example, the memory 512) and executed by a processing device (for example, the processor 510), or a combination thereof that is configured to receive and/or transmit data from/to another computing device. The communication interface 514 may include, for example, an antenna, a transmitter, a receiver, a transceiver, and/or supporting hardware or software for enabling communications with one or more remote devices. The communication interface 514 may be configured to receive and/or transmit data using any protocol that may be used for communications between devices.

The user interface 516 may be in communication with the processor 510 to receive an indication of a user input and/or to provide an audible, visual, mechanical, or other output to a user. As such, the user interface 516 may include, for example, a keyboard, keypad, scanner, printer, mouse, joystick, display (e.g., touch screen display), microphone, speaker, and/or other input/output mechanisms. The processor 510 and/or user interface circuitry comprising the processor 510 may be configured to control one or more functions of the user interface 516 through computer program instructions (e.g., software and/or firmware) stored on memory (e.g., memory 512) accessible to the processor 510.

The specialized circuitry 518 may be embodied as various means, such as circuitry, hardware, a computer program product comprising computer readable program instructions stored on a computer readable medium (for example, the memory 512) and executed by a processing device (for example, the processor 510), or some combination thereof and, in some embodiments, is embodied as or otherwise controlled by the processor 510.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method for providing payment for a transaction comprising:
    capturing, by a camera of a mobile device, an image comprising both a transaction bill and a form of payment for providing payment for the transaction, wherein capturing further includes capturing the form of payment within an outlined area printed on the transaction bill that identifies where the form of payment is to be placed on the transaction bill before the image is captured;
    posting, by the mobile device, the image to a server for payment of the transaction;
    determining, by the server, the transaction identifier from the captured image in response to the posting;
    determining, by the server, payment information from the captured image;
    processing, by the server, the payment information as payment for the transaction; and
    providing, by the server, communication of payment to a Point-Of-Sale (POS) terminal that produced the transaction bill.

2. The method of claim 1, wherein the form of payment is selected from the group consisting of a credit card, debit card, gift card, and loyalty card.

3. The method of claim 1, wherein the transaction bill comprises the transaction identifier.

4. The method of claim 3, wherein the transaction identifier is encoded as a bar code selected from the group consisting of a one-dimensional barcode and a two-dimensional bar code.

5. The method of claim 1, receiving input from a user for supplementing information obtained from the captured image.

6. The method of claim 5, wherein the input received comprises information selected from the group consisting of a personal identification number, a security code associated with the form of payment, and a gratuity to be added to a total cost of the transaction.

7. The method of claim 1, further comprising:
    storing the captured image for verifying the transaction.

8. A method for facilitating payment for a transaction comprising:
    obtaining, from a mobile device by a Point-Of-Sale (POS) terminal, a captured image comprising both an indication of a bill for a transaction and a payment card for paying the bill, the indication of the bill comprising a transaction identifier, and wherein obtaining further includes obtaining a payment image for the payment card within an outlined area printed on the bill that identifies where the payment card is to be placed on the bill before the captured image is obtained from the mobile device;
    determining, by the POS terminal, the transaction identifier from the captured image;
    determining, by the POS terminal, payment information from the captured image; and
    processing, by the POS terminal, payment of the transaction identified by the transaction identifier by processing the payment information with the transaction identifier.

9. The method of claim 8, wherein the transaction identifier is encoded as a bar code selected from the group consisting of a one-dimensional barcode and a two-dimensional bar code.

10. The method of claim 9, wherein determining the transaction identifier from the captured image comprises:
    decoding the bar code depicted in the captured image that encodes the transaction identifier.

11. The method of claim 8, wherein the payment card is selected from the group consisting of a credit card, debit card, gift card, and loyalty card.

12. The method of claim 8 further comprising:
    receiving input supplementing the payment information determined from the captured image; and
    validating the payment card based on the received input.

13. The method of claim 8 further comprising:
    generating a receipt for the transaction; and
    providing the receipt to the customer for confirming payment for the transaction.

14. The method of claim 8 further comprising:
storing the captured image for verifying the transaction.

15. A system comprising:
- a device configured to capture an image comprising both a transaction bill and a form of payment for paying the transaction bill;
- a point-of-sale (POS) terminal configured to process payment for the transaction bill based on processing the form of payment in the captured image, wherein the form of payment is identified from the captured image within an outlined area printed on the transaction bill that identifies where the form of payment is to be placed on the transaction bill before the captured image is captured, payment information is determined from the form of payment identified in the captured image, payment processing is performed with the payment information, and a notice of payment is provided to the device.

16. The system of claim 15, wherein the transaction bill comprises a transaction identifier.

17. The system of claim 16, wherein the transaction identifier is encoded as a bar code selected from the group consisting of a one-dimensional barcode and a two-dimensional bar code.

18. The system of claim 15, wherein the device is configured to transmit the captured image to the point-of-sale terminal, wherein the point-of-sale terminal is configured to identify a transaction associated with the transaction bill from the captured image.

19. The system of claim 15, wherein the form of payment is selected from the group consisting of a credit card, debit card, gift card, and loyalty card.

\* \* \* \* \*